United States Patent Office 3,519,232
Patented July 7, 1970

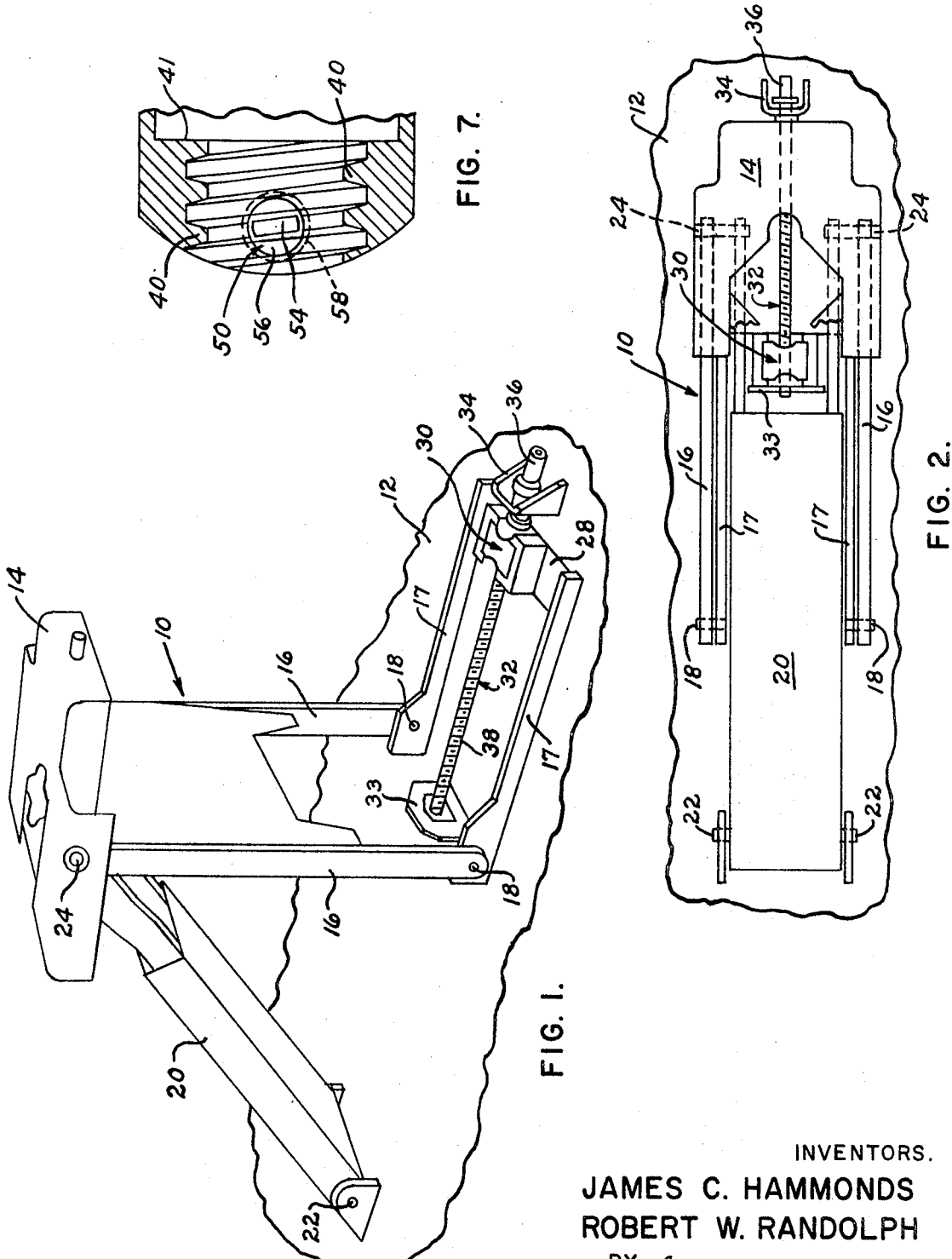

3,519,232
ELEVATING SCREW NUT FOR TRAILER HITCHES ON RAILWAY CARS
James C. Hammonds and Robert W. Randolph, St. Charles, Mo., assignors to ACF Industries, Incorporated, New York, N.Y., a corporation of New Jersey
Filed Oct. 3, 1968, Ser. No. 764,820
Int. Cl. F16b 37/00
U.S. Cl. 248—119       2 Claims

ABSTRACT OF THE DISCLOSURE

A nut for an elevating screw on a trailer hitch to move the hitch between erect and collapsed positions. The nut has a central well containing lubricant for the elevating screw and wiper means are provided adjacent the ends of the nut to minimize the entry of foreign matter into the well and the passage of lubricant from the nut. The wiper adjacent one end of the nut engages the external screw threads on the screw and wipes any foreign matter from the screw threads before the foreign matter enters the nut and lubricant well. The wiper means adjacent the opposite end of the nut wipes excess lubricant from the screw and prevents the passage of the lubricant from the nut.

BACKGROUND OF THE INVENTION

Elevating screw nuts on trailer hitches for railway piggyback cars are subjected to relatively high thrust forces during the raising and lowering of the associated trailer hitch. It is necessary that the screw be lubricated periodically and this requires considerable maintenance work. With high forces being developed in the nut, any foreign matter between the interfitting screw threads of the screw and nut acts as an abrasive resulting in wear of the screw threads of the nut. Nuts have been replaced frequently due to such wear during operation of the trailer hitch.

DESCRIPTION OF THE INVENTION

The present invention provides a self-lubricating nut which has a central lubricant well for lubricating the screw upon rotation thereof and a resulting travel of the nut. To clear the screw of adhering foreign matter as the nut travels along the screw during rotation of the screw, a wiper element is positioned adjacent each end of the nut and engages the external threads on the screw to clear the screw of foreign matter. A portion of the internal thread of the nut is cutaway adjacent each end of the nut to receive the wiper elements, and means resiliently urge the wiper elements inwardly into tight frictional engagement with the external threads on the screw. The wiper elements also minimize the passage of lubricant from the nut during rotation of the screw.

The invention accordingly comprises the constructions hereinafter described, the scope of the invention being indicated in the following claims.

In the accompanying drawings, in which one of various possible embodiments of the invention is illustrated, FIG. 1 is a perspective of a trailer hitch for a railway piggyback car and shown in an erect position employing the elevating screw nut comprising the present invention;

FIG. 2 is a top plan of the trailer hitch of FIG. 1 shown in a collapsed position with the elevating screw nut positioned adjacent an end of an elevating screw;

FIG. 7 is an enlarged section taken generally along line 7—7 of FIG. 3 and showing the wiper element mounted within a cutout portion of a screw thread.

Corresponding reference characters indicate corresponding parts throughout the several views of the drawings.

Figure 6:
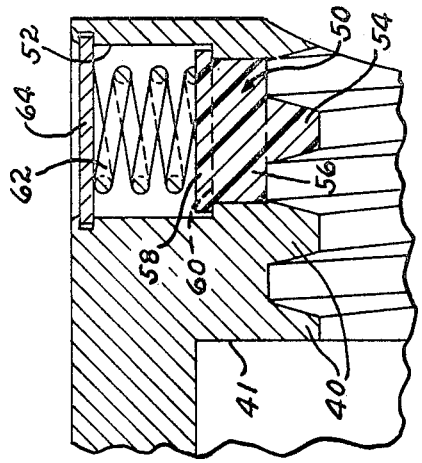
FIG. 6 is an enlarged section taken generally along line 6—6 of FIG. 4 and illustrating a wiper element mounted adjacent an end of the nut.
Figure 4:
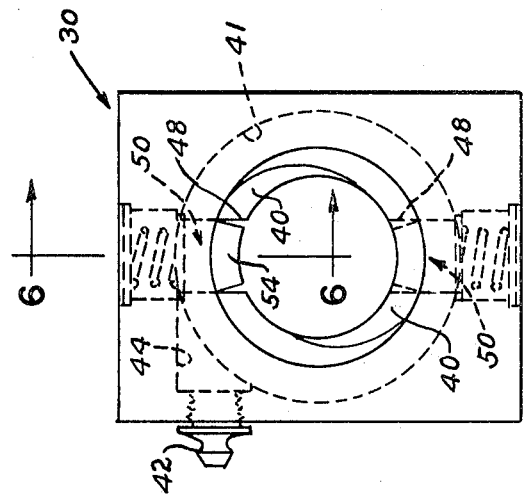
FIG. 4 is an end elevation of the nut shown in FIG. 3.
Figure 5:
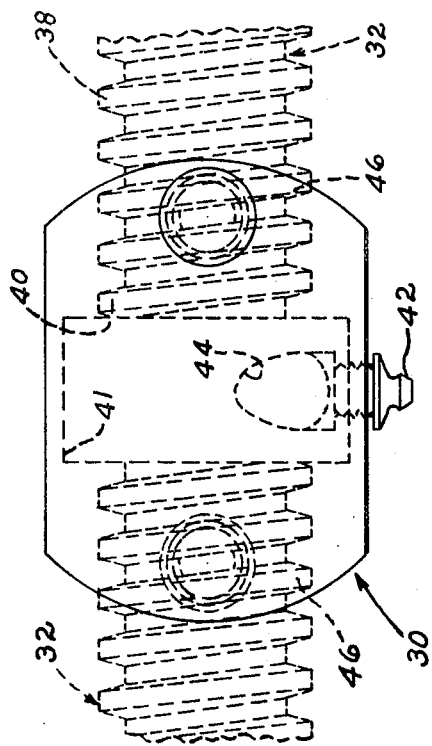
FIG. 5 is a side elevation of the nut shown in FIGS. 3 and 4.
Figure 3:
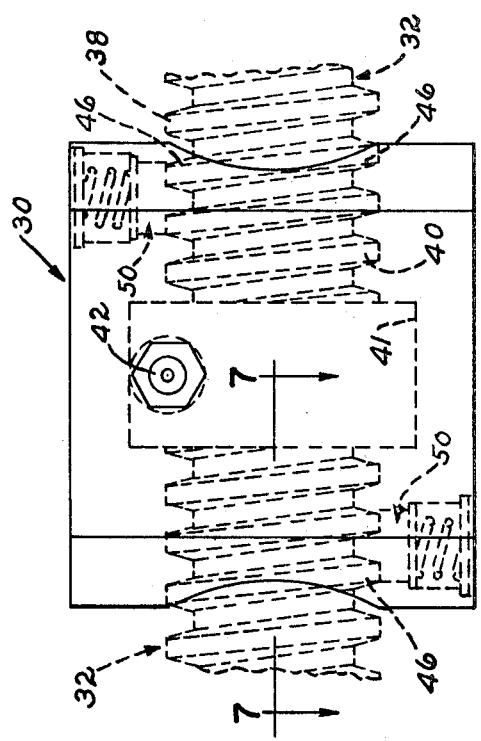
FIG. 3 is an enlarged top plan of the nut shown in FIGS. 1 and 2.

Referring now to the drawings for a better understanding of this invention, a trailer hitch generally indicated 10 is illustrated in FIGS. 1 and 2 and is mounted on the deck 12 of a railway car. Hitch 10 is shown in an erect position in FIG. 1 and in a collapsed position in FIG. 2. Trailer hitch 10 includes an upper mounting plate 14 which is adapted to secure the kingpin of a trailer for securing the trailer on a railway flat car for transit.

A vertical leg 16 is pivoted at 18 to a slide or yoke 17 mounted for sliding movement along deck 12 and a diagonal leg 20 is fixedly pivoted at 22 to deck 12. Legs 16 and 20 are pivoted at 24 to mounting plate 14. Upon sliding movement of slide 17 along deck 12, the lower end of leg 16 is moved therewith to move hitch 10 between collapsed and erect positions. Slide 17 includes a cross support 28 having a slide block or nut 30 secured thereto. An elevating screw 32 engages nut 30 and upon rotation moves nut 30 and slide 17 back and forth to move hitch 10 between collapsed and erect positions. Bracket 33 supports the inner end of screw 32. A bracket 34 supports an outer end of screw 32 and a splined socket 36 on the end of screw 32 may be engaged by a suitable power wrench or the like to rotate screw 32. For further details of hitch 10, reference is made to Pat. No. 3,145,006 dated Aug. 18, 1964, and entitled "Collapsible Trailer Support and Anchor," the entire disclosure of which is incorporated in this reference.

As hitch 10 is moved between collapsed and erect positions, relatively large forces are transmitted between elevating screw 32 and nut 30. As foreign matter tends to collect on the external screw threads 38 of screw 32, the movement of nut 30 along screw 32 would effect an abrasive action between the internal screw threads 40 of nut 30 and coacting external screw threads 38 of screw 32 if the foreign matter enters nut 30.

To provide a nut having lubricant therein for lubricating screw 32 as nut 30 travels along screw 32, nut 30 includes an internal lubricant well 41 having a lubricant fitting 42 in communication therewith through opening 44 for filling well 41 with a suitable lubricant. Internal screw threads 40 comprise end portions 46 on opposite sides of lubricant well 41 and engage external screw threads 38 on screw 32. A portion of screw thread 40 is cutaway at 48 for each end portion 46 and a non-metallic wiper element generally indicated 50 is mounted within the cutaway portion 48 for each end portion 46. Nut 30 has an opening or bore 52 therein to receive wiper element 50 as shown particularly in FIG. 6.

Wiper element 50 includes an elongate projection 54 projecting into the cutaway portion 48 of screw thread 40 and of a width substantially the same as the adjacent screw thread to form a continuation thereof. A main body 56 of wiper element 50 includes an annular flange 58 fitting on an adjacent ledge 60 to retain wiper element 50. A spring 62 urges wiper element 50 inwardly and a cover 64 may be releasably secured by suitable screws to retain spring 62 in position. Projection 54 engages the surfaces of the external screw thread 38 on screw 32 and wipes the surface of adhering foreign matter as well as lubricant. Thus, wiper elements 50 on opposed ends of nut 30 minimize any leakage of lubricant from the nut 30 and tend to seal the lubricant within the nut in addition to wiping the screw of adhering foreign matter. Such an arrangement provides a long life self lubricating nut which has been found to be very satisfactory in use.

In view of the above, it will be seen that the several objects of the invention are achieved and other advantageous results obtained.

What is claimed is:

1. In a collapsible trailer hitch movable between collapsed and erect positions and having, an upstanding leg, a slide member connected adjacent the lower end of said leg for moving the leg back and forth, and an externally threaded screw operatively connected to said slide member; the improvement comprising a nut threaded on said screw and connected between the screw and slide member for moving said slide member in a generally horizontal direction upon rotation of said screw, said nut having an internal screw threaded portion adjacent each end thereof, an enlarged lubricant well between the threaded end portions, each of said screw threaded end portions having a portion of the screw thread cutaway and forming a bore adjacent each end of the nut extending perpendicularly to the longitudinal axis of the screw, a non-metallic wiper means inserted within each bore for each screw threaded portion and engaging the external screw thread of said srcew, and spring means resiliently urging the wiper means inwardly into contact with said screw to minimize any passage of lubricant from the nut and to minimize the entry of foreign matter into the nut, said wiper means including an inwardly extending projection extending within the associated cutaway screw thread, said inwardly extending projection being elongate and having a configuration generally the same as the screw thread adjacent the cutaway portion to form a continuation of said screw thread on the nut for engaging the screw threads of said screw.

2. For use with an elevating screw for raising and lowering a trailer hitch; a nut adapted to be threaded on the elevating screw and having an internal screw threaded portion adjacent each end thereof with a portion of the screw thread of each end portion being cutaway, an enlarged lubricant well between the threaded end portions, a lubricant fitting communicating with said well to permit lubricant to be added to said well, a bore adjacent each end of the nut extending perpendicularly to the longitudinal axis of the screw and communicating with the cutaway screw thread for the associated screw threaded portion, a non-metallic wiper element mounted within each bore and engaging the external screw thread of said screw, each wiper element including an inwardly extending projection having a configuration generally the same as the screw thread adjacet the cutaway portion to form a continuation of the associated screw thread to minimize any passage of lubricant from the nut and to minimize the entry of foreign matter into the nut, and spring means resiliently urging each wiper element inwardly.

References Cited

UNITED STATES PATENTS

| | | | |
|---|---|---|---|
| 750,211 | 1/1904 | Miner | 151—24 |
| 1,561,679 | 11/1925 | Woodring et al. | 85—32 |
| 1,783,354 | 12/1930 | Ainsworth | 85—32 |
| 1,785,406 | 12/1930 | Cornett. | |
| 2,422,495 | 6/1947 | Morrow | 74—424.8 |
| 2,757,548 | 8/1956 | Smith et al. | 74—424.8 |
| 2,818,745 | 1/1958 | Spontelli | 74—424.8 |
| 3,145,006 | 8/1964 | Robinson et al. | 248—119 |

EDWARD C. ALLEN, Primary Examiner

U.S. Cl. X.R.

74—424.8; 85—32